United States Patent [19]

Da Silva

[11] 4,085,545
[45] Apr. 25, 1978

[54] DEVICE FOR THE EXTRACTION OF SUGAR CANE GEMMAS DESTINED TO THERMOTHERAPIC TREATMENT FOR THE CONTROL OF THE BLIGHT OF SUGAR CANE STUMPS LEFT AFTER CUTTING

[75] Inventor: Wilson Marcelo Da Silva, Piracicaba, Brazil

[73] Assignee: Cooperativa Central dos Produtores de Acucar E Alcool do Estado de Sao Paulo, Sao Paulo, Brazil

[21] Appl. No.: 735,063

[22] Filed: Oct. 22, 1976

[51] Int. Cl.² ............................................. A01G 1/00
[52] U.S. Cl. ............................................. 47/58; 47/7; 47/DIG. 9; 408/206; 83/569; 99/514
[58] Field of Search ............... 83/97, 569; 408/87, 408/204–207; 47/1, 6–7, DIG. 9, 58; 99/514, 542, 544

[56] References Cited

U.S. PATENT DOCUMENTS

| | | | |
|---|---|---|---|
| 325,856 | 8/1885 | Murphey | 408/204 X |
| 1,378,258 | 5/1921 | Manderfield | 99/514 |
| 2,626,667 | 1/1953 | Spiller | 408/205 X |

*Primary Examiner*—Robert E. Bagwill
*Attorney, Agent, or Firm*—Emory L. Groff, Jr.

[57] ABSTRACT

An apparatus for forming gemmas to be treated to control the blight of sugar cane stumps consists of a hollow rotatable shaft and a rotatable thimble extending from one end of the shaft. An axially movable punch member is mounted in alignment with the thimble so that a piece of material such as sugar cane culm can be placed between the punch and thimble and have the gemma or bud portion punched out by axial movement of the punch member. The punched out portions are expelled and collected at the opposite end of the hollow shaft. The entire apparatus is mounted on a metal frame.

5 Claims, 6 Drawing Figures

DEVICE FOR THE EXTRACTION OF SUGAR CANE GEMMAS DESTINED TO THERMOTHERAPIC TREATMENT FOR THE CONTROL OF THE BLIGHT OF SUGAR CANE STUMPS LEFT AFTER CUTTING

This invention relates to and apparatus for the production of sugar cane gemmas to be treated for the control of the blight of sugar cane stumps left after cutting.

The present invention has for an object a device for punching out portions of sugar cane gemmas for treatment for the control of the blight of sugar cane stumps left after cutting. The the clums or joints of the cane stalks are cut in lenght by any conventional means and forced into a hollow rotative cutting tool, that cuts out a part of the culm which contains the gemma or bud portion. Since this tool is hollow the cut out portions are expelled through the tube and collected for treatment.

The present device has no precedent to refer to since for the production of process of the previous extration of the gemmas in discs for such treatment is entirely new, replacing advantageously the traditional methods by which such treatment was made on the whole culm or on small tholes including one or more internodes and respective gemmas.

Other uses, objects and advantages of this invention will become apparent from the disclosure hereinafter set forth with particular reference to the accompanying drawings forming a part thereof and wherein like numerals describe like parts in which.

Figure 1:
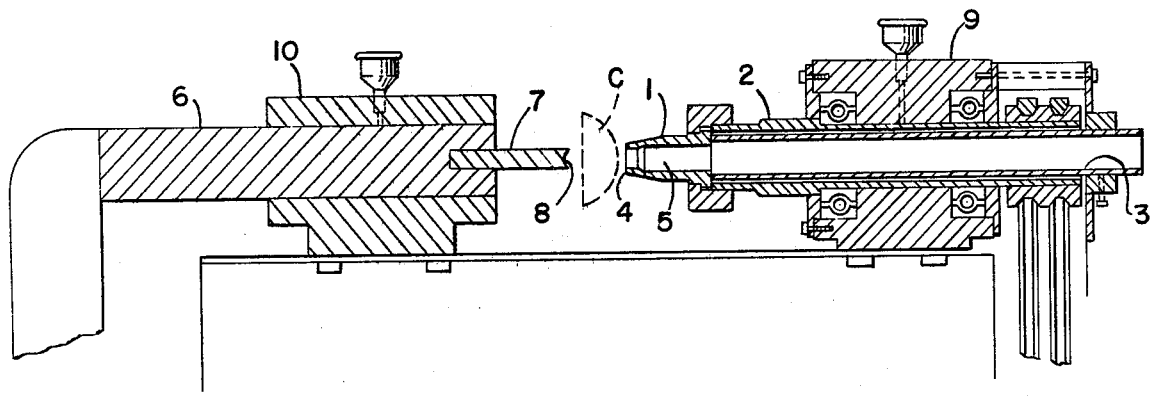
FIG. 1, is a cross sectional view of the device for punching out a section of material, with the material shown in dotted lines in position to be punched.

Referring now to the above described drawings, a frame A is provided for mounting and supporting the components of the invention. Supported on top of the frame A is a bearing member 9 rotatably supporting a hollow shaft 2 having a tubular lining 3. Rigidly connected to one end of said shaft 2 is a hollow thimble member 1 having a principal internal diameter at portion 5 which is smaller which is smaller than that of the tubular lining 3 and having a diameter slightly less than that of the principal diameter at its opposite end portion 5'. The thimble member 1 has its outer diameter tapered inwardly at its end 4 to form a sharp cutting edge. A second bearing member 10 carries a thrust member 6 axially slidably mounted in alignment with the shaft 2. Secured in one end of member 6 is a cylindrical punch member 7 having a diameter slightly smaller than the diameter at end portion 5' of the thimble member and formed with a concave depression at its end 8, providing a sharp edge at its circumference.

Figure 5:
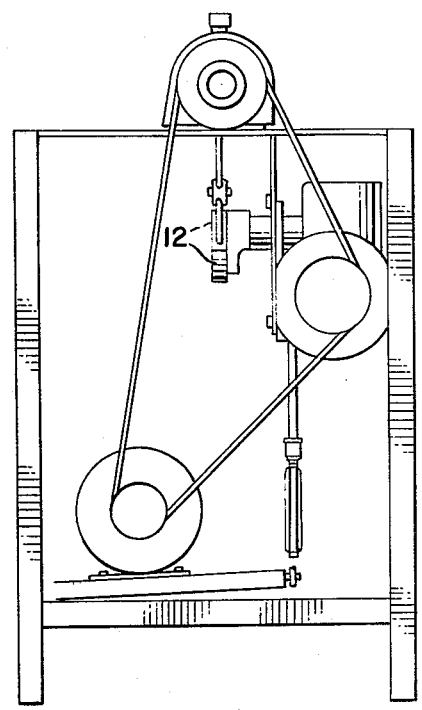
FIG. 5, is a side view of FIG. 3.

In order to move the thrust member 6 to operate the punch 7, a connecting rod 11 is provided and connected at one of its ends to operate the member 6 by means of any conventional linkage represented by the reference numeral B. At its other end the rod 11 is connected to a crank 12 extending from the gear box of a reduction gearing 13. Mounted on the frame A below the reduction gearing 13 is a motor 14 having a pulley 15 adapted to drive the belts 16 which drive pulleys which in turn drive the reduction gearing 13 and the hollow shaft 2, as shown especially in FIG. 5.

Figure 2:
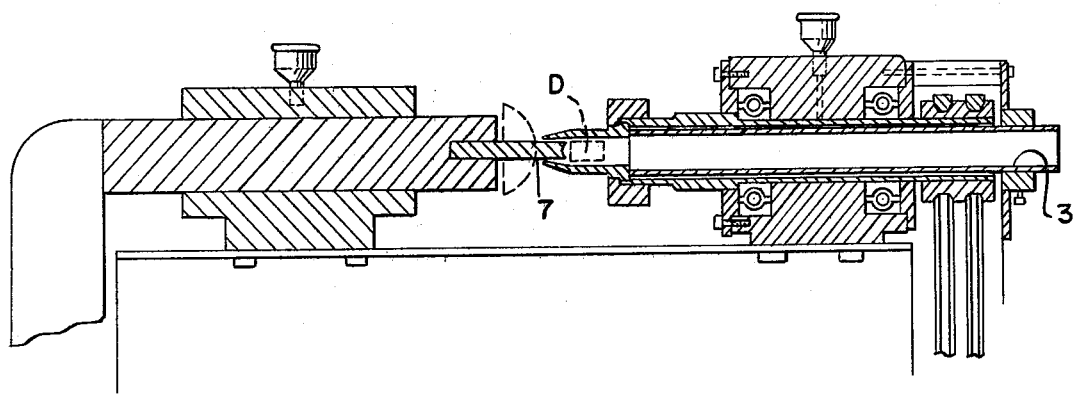
FIG. 2, shows a cross sectional view as in FIG. 1 but in a position where the material has had a portion punched therefrom, the material and punched out portion being shown in dotted lines.
Figure 3:
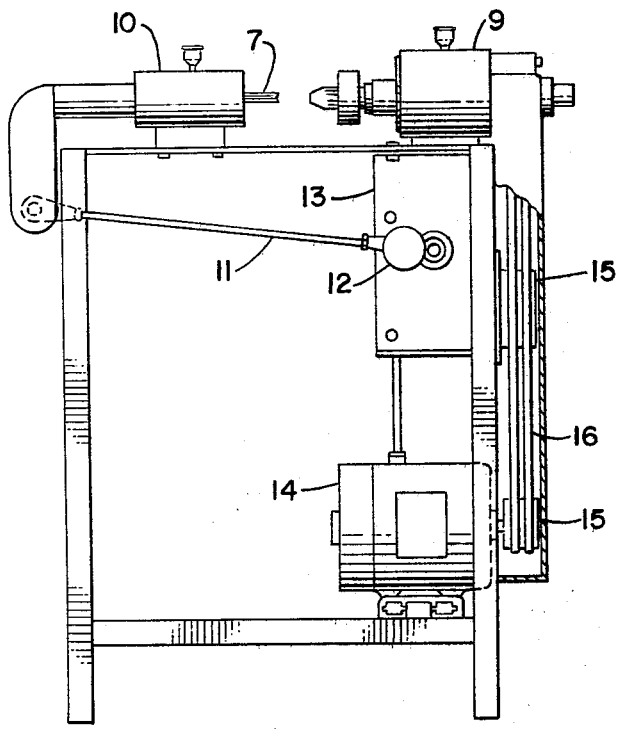
FIG. 3, shows an elevation of the apparatus of the invention with the components thereof mounted on a frame, and with the punch mechanism in open position.
Figure 4:
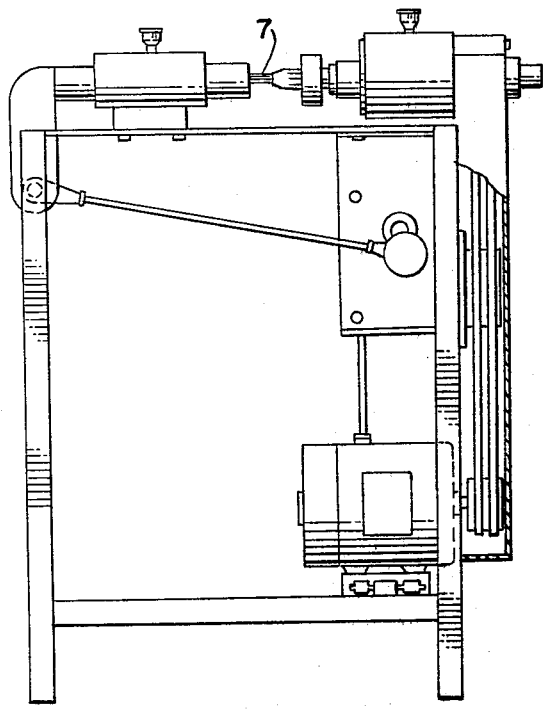
FIG. 4, is an elevation, as in FIG. 3, but showing the punch mechanism in punching position.
Figure 6:
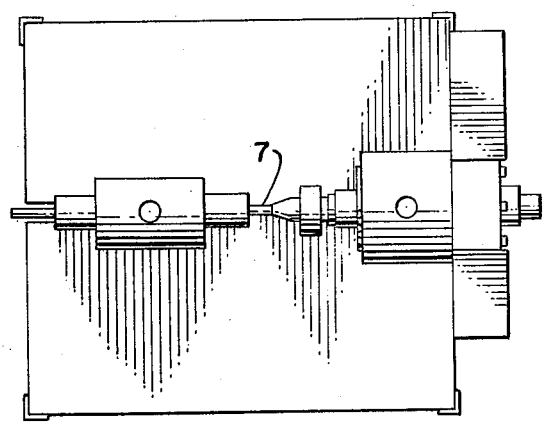
FIG. 6, is a plan view of FIG. 3.

In use, a portion of a sugar cane stalk, known as a culm is placed between the punch 7 and the thimble 1, as represented in dotted lines by reference character C in FIG. 1. Upon activation of the motor 1, the shaft 2 and thimble 1 will be rotated and the crank 12 will be turned from the position shown in FIG. 3 to the position shown in FIG. 4, thus pulling on connecting rod 11 and, through linkage B, thrusting the punch 7 against the material C, thus moving the material against the rotating sharp edge of thimble member 1 and cutting out a portion of the material. This position is shown in FIG. 2, wherein the portion D, shown in dotted lines, has been cut out of the material C. The portions D can move through the tube 3 and be collected at the end thereof.

Obviously such elements as including bearings, connecting rods, eccentric and others, can be of any type, knwon devide, not a characteristical part of said device, and secondary constructive details, may be varied from the structure claimed in the annexed claims forming a, part of this specification.

I claim:

1. Apparatus for cutting the gemma or bud section from a sugar cane culm, comprising a supporting structure, a first bearing member mounted on said supporting structure, a hollow shaft rotatably mounted in said bearing member, a tubular lining in said hollow shaft, a hollow thimble member rigidly secured at one end to one end of said hollow shaft, said thimble member having a principal internal diameter slightly less that that of the tubular lining, and having an internal diameter slightly less than that of the principal diameter at its opposite end, the outside diameter of the thimble member being tapered at said opposite end to form a sharp cutting edge, a second bearing member mounted on said supporting structure in alignment with said first bearing member, a punch member carried by said thrust member coaxially and in alignment with said thimble member, the diameter of said punch member being slightly less than the diameter of the end portion of said thimble member, means for rotating said hollow shaft and thimble member and for moving said thrust member and punch member axially, whereby a culm placed between the punch and the thimble is first pressed against the rotating cutting edge of the thimble and then a section of the culm is cut out and moved into the hollow thimble and tubular lining.

2. Apparatus in accordance with claim 1, wherein a motor is mounted on said support structure to drive said rotatably mounted hollow shaft by pulley and belt means.

3. Apparatus in accordance with claim 2, wherein a reduction gearing is mounted on said support structure and provided with linkage to move said thrust member.

4. Apparatus in accordance with claim 3, wherein said pulley and belt means is arranged to drive said reduction gearing.

5. A method of obtaining the gemma or bud section of sugar cane culm comprising, pressing said culm against a circular rotating cutting edge, punching said section of said culm against said edge, cutting out said section by a rotatable cutting action, and moving said section to a receiving area.

* * * * *